(12) United States Patent
Sullivan, Jr.

(10) Patent No.: US 6,834,756 B2
(45) Date of Patent: Dec. 28, 2004

(54) CONVEYING SYSTEM AND METHOD

(75) Inventor: James F. Sullivan, Jr., Dallas, TX (US)

(73) Assignee: Triple/S Dynamics, Inc., Dallas, TX (US)

( * ) Notice: Subject to any disclaimer, the term of this patent is extended or adjusted under 35 U.S.C. 154(b) by 60 days.

(21) Appl. No.: 09/971,716

(22) Filed: Oct. 4, 2001

(65) Prior Publication Data

US 2003/0066735 A1 Apr. 10, 2003

(51) Int. Cl.[7] .............................................. B65G 27/00
(52) U.S. Cl. ............................. 198/752.1; 198/750.1; 198/758; 198/771
(58) Field of Search .................... 198/752.1, 750.1, 198/758, 771

(56) References Cited

U.S. PATENT DOCUMENTS

| 1,219,861 | A | 3/1917 | Payne et al. | 74/52 |
| 1,307,474 | A | 6/1919 | Baldwin et al. | 74/52 |
| 2,360,762 | A | 10/1944 | Conrad | 74/52 |
| 2,524,734 | A | 10/1950 | Pfau | 74/52 |
| 3,288,095 | A | 11/1966 | Ballo | 113/113 |

(List continued on next page.)

FOREIGN PATENT DOCUMENTS

SU  630146 A  10/1978

OTHER PUBLICATIONS

Regal Plastic, Plastics Reference Handbook, 1999.*
Poly Hi Solidur, System TIVAR—Custom Solutions for Food Processing, 1997.*
Alro, Alro Plastics—Your Source for FDA Compiant Materials and Parts.*
Poly Hi Solidur, Technical Information TIVAR CleanStat, 1998.*
Slipstick Conveyor, Brochure, pp. 1–14, Triple/S Dynamics, Inc.

*Primary Examiner*—Richard Ridley
(74) *Attorney, Agent, or Firm*—Sidley Austin Brown & Wood LLP

(57) ABSTRACT

A conveyor assembly having a conveying member made substantially of ultra-high-molecular-weight polyethylene material. The conveying member can be provided with a support structure for supporting the conveying member. At least one biasing member and at least one securing member can be used to secure the conveying member to the support structure. The biasing member and the securing member, along with the support structure, form an arrangement which can allow the conveying device to accommodate the growths and deformities of the conveying member.

11 Claims, 4 Drawing Sheets

U.S. PATENT DOCUMENTS

| | | | | |
|---|---|---|---|---|
| 3,417,882 A | * | 12/1968 | McConnell | 198/538 |
| 3,604,278 A | | 9/1971 | Hartsell | 74/52 |
| 3,805,627 A | | 4/1974 | Burton et al. | 74/52 |
| 3,857,292 A | | 12/1974 | Brems | 74/52 |
| 3,859,862 A | | 1/1975 | Brems | 74/82 |
| 4,199,053 A | | 4/1980 | Casteel | 198/523 |
| 4,226,326 A | * | 10/1980 | Watkins | 198/758 |
| 4,245,516 A | | 1/1981 | Day | 74/52 |
| 4,260,051 A | | 4/1981 | Burghart | 198/760 |
| 4,313,535 A | | 2/1982 | Carmichael | 198/766 |
| 4,449,626 A | * | 5/1984 | Dodd | 198/765 |
| 4,492,629 A | * | 1/1985 | Dumbaugh | 209/332 |
| 4,528,860 A | | 7/1985 | Barr | 74/52 |
| 4,573,566 A | | 3/1986 | Roman | 198/461 |
| 4,726,240 A | | 2/1988 | Brems | 74/27 |
| 4,768,647 A | | 9/1988 | Lehtola | 198/760 |
| 4,813,532 A | | 3/1989 | Harper | 198/760 |
| 5,029,697 A | | 7/1991 | McMillan et al. | 198/860.2 |
| 5,046,602 A | | 9/1991 | Smalley et al. | 198/750 |
| 5,131,525 A | * | 7/1992 | Musschoot | 198/770 |
| 5,351,807 A | | 10/1994 | Svejkovsky | 198/750 |
| 5,392,898 A | | 2/1995 | Burgess, Jr. et al. | 198/750 |
| 5,555,967 A | | 9/1996 | Hufford | 198/359 |
| 5,584,375 A | | 12/1996 | Burgess, Jr. et al. | 198/751 |
| 5,690,567 A | | 11/1997 | DeNijs et al. | 474/73 |
| 5,692,986 A | | 12/1997 | Long et al. | 475/14 |
| 5,699,897 A | | 12/1997 | Svejkovsky | 198/750.8 |
| 5,850,906 A | | 12/1998 | Dean | 198/750.8 |
| 5,868,241 A | | 2/1999 | Pellegrino | 198/763 |
| 6,019,216 A | * | 2/2000 | Patterson | 198/752.1 |
| 6,095,314 A | * | 8/2000 | Fortenbery | 198/360 |
| 6,202,994 B1 | * | 3/2001 | Spurlin | 267/136 |
| 6,276,518 B1 | * | 8/2001 | Wierman | 198/752.1 |
| 6,357,579 B1 | * | 3/2002 | Patterson et al. | 198/766 |
| 6,516,940 B1 | * | 2/2003 | Hart et al. | 198/781.1 |
| 6,536,750 B1 | * | 3/2003 | Martin | 267/136 |

* cited by examiner

US 6,834,756 B2

CONVEYING SYSTEM AND METHOD

FIELD OF THE INVENTION

This invention is directed generally to a conveyor for conveying materials. In one aspect, the invention relates to a device and method for conveying materials without accumulating a product build up on a conveying surface due to friction that opposes a conveying motion. In another aspect, the invention relates to a device and method for conveying materials without storing an electrical charge that is produced on the conveyor as a result of an interaction between the surface of the conveyor and the materials being conveyed, thus producing a conveying surface that exhibits substantially improved release characteristics. In yet another aspect, the invention relates to a conveyor which is a trough made substantially of an ultra-high-molecular-weight material. In yet a further aspect, the invention relates to a conveyor which is fixedly secured to at least one position and able to move in a predetermined direction at other positions.

BACKGROUND OF THE INVENTION

Conveying systems are widely used in many settings to transport products from one location to another. Horizontal motion conveyors have been used in such instances, and in particular, have been used in the conveying of food products. Due to the substantially horizontal motion generated by horizontal motion conveyors, products are less likely to incur damages as they are conveyed on horizontal motion conveyors. Thus, because of their quality preserving characteristics, horizontal motion conveyors are used in food handling and food conveying environments, as well as other settings.

However, conventional horizontal motion conveyors are also susceptible to clogging. That is, the conveying surfaces of conventional horizontal motion conveyors are generally formed of carbon or stainless steel, and these materials generally exhibit a high coefficient of friction. Thus, as a product is conveyed along a conveying surface, residue from pieces of the product can remain on the conveying surface and can lead to an undesirable product build-up on the conveying surface. In a case of conveying a product with a tendency to adhere to a conveying surface, the conveying path of the horizontal motion conveyor can become clogged due to residual build up, resulting in restricted movement of the products being conveyed.

To overcome these problems, conveying systems using anti-static material linings positioned on a surface portion of the conveyors have been developed. Conventional uses of the anti-static material include securing sectional pieces of the anti-static material linings to surface portions of a conveyor in order to combat the adherence of a product being conveyed to the surface of the conveyor. Accordingly, the anti-static material lining that is attached to the surfaces of the conveyor interacts with the product being conveyed. This minimizes residual accumulation of the product on the surface of the conveyor.

However, the arrangements for securing the anti-static material linings to the surfaces of conveyors have contributed to unsanitary conditions of conveyors, and have compromised the quality of the products that are conveyed on the conveyors. In particular, due to the use of sectioned pieces of the anti-static material linings that attach to the surfaces of the conveyor, contact gaps occur at the edges of the anti-static material linings between the surface of the conveyor and the anti-static material linings, as well as at positions where a plurality of pieces of the anti-static material linings abut.

Contact gaps can also occur around openings that are formed through a floor portion of the conveyor. Such openings are generally regulated by the opening and closing of a gate, which controls the discharge of materials from the conveyor at intermediate positions along the conveying path.

The contact gaps can accumulate undesirable material. For example, food, moisture, and other materials that remain trapped in the contact gaps can degrade the sanitary conditions of the conveyor, and accordingly, the conveyor requires repeated attention and cleaning Moreover, in the case of a conveyor with a gate formed in a bottom portion, the contact gaps can lead to production problems when the product flow is not accurately controlled due to leaking or restricted product flow.

Although attempts have been made to seal the contact gaps created by the anti-static material linings that are attached to the surfaces of conveyors, these attempts have been unreliable, and sanitary conditions remain questionable. Therefore, contact gaps created when anti-static material linings are attached to a surface of a conveyor require constant monitoring and cleaning.

In addition, the properties of some anti-static materials have made their use difficult in conveying systems. For example, an ultra-high-molecular-weight (UHMW) material, has a very high rate of thermal expansion, and thus, UHMW material is very sensitive to changes in environmental conditions, and in particular, very sensitive to changes in temperature. The UHMW material's high sensitivity to temperature changes has hindered the integration of UHMW material into more conveying settings, as temperature fluctuations, including warm and high temperatures, are frequently encountered in such environments.

Thus, there exists a need for a conveyor that provides conveying surface which can resist friction and can provide good static-dissipating characteristics, while satisfying sanitation requirements and quality standards. Further, there exists a need for a conveyor that utilizes the release characteristics of UHMW material and accommodates the expansion and contraction in the UHMW material due to changes in temperature. A need further exists for a conveyor that provides good static-dissipating qualities and greatly eliminates contact gaps in a conveyor using the UHMW material. There also exists a need for a conveyor that eliminates the contact gaps between a bottom opening in a conveyor and a gate formed at the opening to regulate the flow of a product through the opening.

BRIEF SUMMARY OF THE INVENTION

The present invention is a new and advantageous device and method for conveying a product on a surface that can efficiently resist a frictional force in a direction opposite to a conveying direction and can dissipate an electrical charge created by an interaction between the conveying surface and a product being conveyed, thus decreasing the likelihood of clogging the conveyor. The conveying assembly meets sanitary requirements by greatly reducing the occurrences of contact gaps throughout the conveying assembly, thereby minimizing maintenance and cleaning requirements, as well as product leakage.

According to one aspect of the invention, a conveying system comprises a conveying member which has friction resistant properties, a support structure for supporting the conveying member, and a driving unit attached to the support structure for generating a conveying motion. The conveying system is provided with at least one securing member for rigidly securing the conveying member to the support structure, and at least one biasing member for allowing relative movement between the conveying member and the support structure along a first axis and for preventing relative movement between the conveying member and the support structure in any direction other than along the first axis. The driving unit produces a conveying motion in the conveying member in order to advance the materials being conveyed along the conveying member in the conveying direction.

According to another aspect of the invention, a conveying member for a conveying system includes a bottom portion on which materials are conveyed during a conveying operation and at least one wall portion for retaining the materials on the bottom portion during the conveying operation. The conveying member consists primarily of a material having friction resistant properties.

According to yet another aspect of the invention, a conveying assembly comprises a conveying system, which includes a conveying member that consists primarily of a material having friction resistant properties, and a support structure for supporting the conveying member. The conveying member is rigidly secured to the support structure by at least one securing member, and is further provided with at least one biasing member for allowing relative movement between the conveying member and the support structure along a first axis and for preventing relative movement between the conveying member and the support structure in any direction other than along the first axis.

According to one aspect, the present invention provides a conveying system that utilizes the self-lubricating aspects of ultra-high-molecular-weight material in order to more efficiently convey a product without generating a product build up on a conveying surface.

According to yet another aspect of the invention, a method of conveying materials along a conveying member includes providing a conveying member having anti-static properties, and producing a conveying motion in the conveying member to advance the materials along the conveying member in the conveying direction.

BRIEF DESCRIPTION OF THE DRAWINGS

Other advantages and features of the invention will become more apparent with reference to the following detailed description of a preferred embodiment thereof in connection with the accompanying drawings, wherein like reference numerals have been applied to like elements, in which:

FIG. 3 is a perspective view of a biasing member of the embodiment of the invention as shown in FIG. 2;

DETAILED DESCRIPTION OF THE INVENTION

Figure 1:
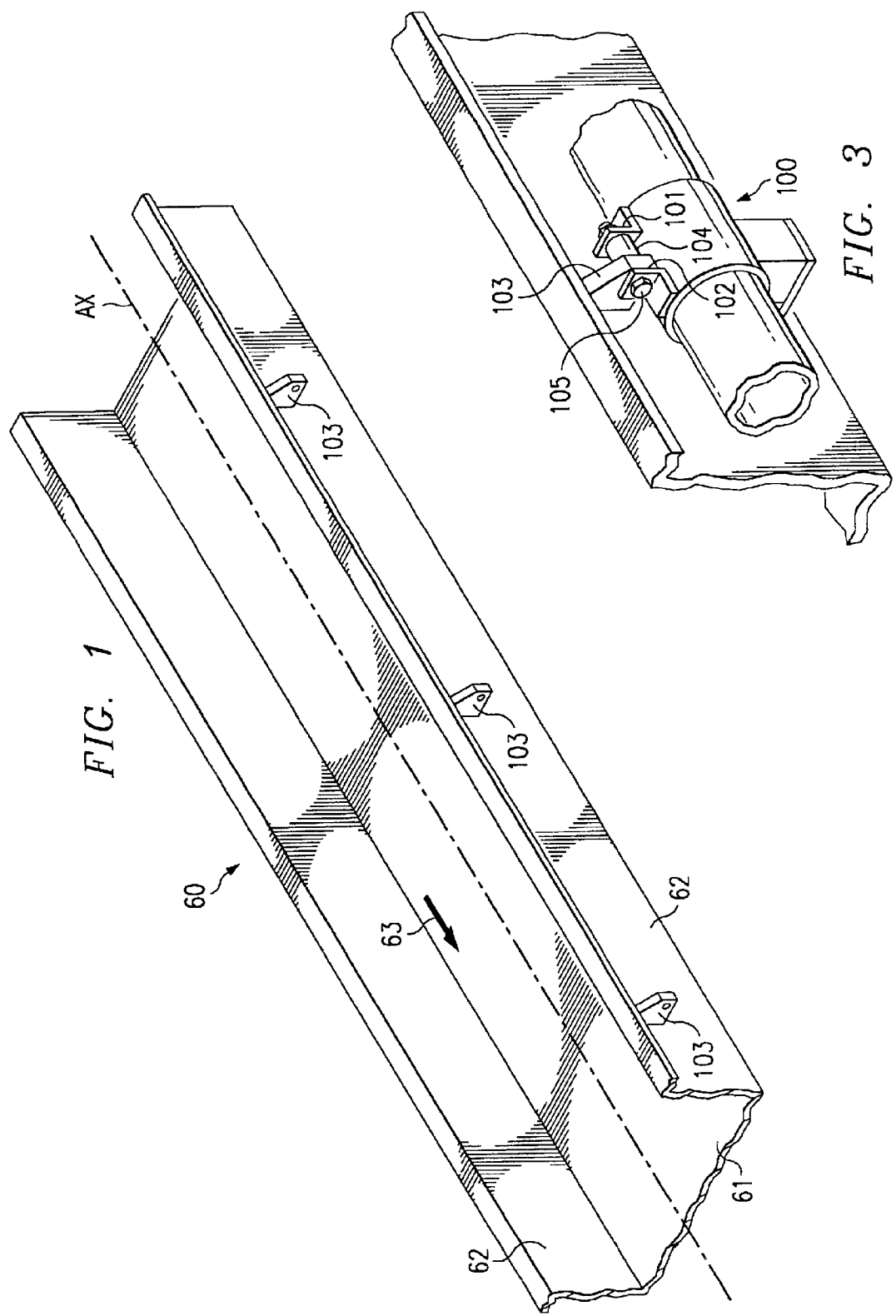
FIG. 1 is a perspective view of a conveying member of the present invention.

Referring to the drawings, and more particularly to FIG. 1, a conveying member for use in a conveying assembly is illustrated. Although the conveying member can be configured in a variety of shapes and arrangements, for the purposes of simplicity, the conveying member, represented by trough 60, will be illustrated and described as a substantially elongated conveyor with a longitudinal axis AX that is substantially parallel to a conveying direction, which may be in the direction of arrow 63 or in a direction that is opposite of the direction indicated by arrow 63.

As shown in FIG. 1, trough 60 is provided with a bottom portion 61 on which a product to be conveyed can be placed for movement along trough 60 in a conveying direction. In a preferred embodiment, at least one wall or retainer portion 62 can be provided for retaining the product being conveyed on trough 60. In an even more preferred embodiment, trough 60 can be provided with two retainer portions 62, as illustrated in FIG. 1.

Trough 60 of the present invention is preferably made of a material that is capable of resisting friction that generally opposes the motion of a product being conveyed on a conveying surface, as well as a static charge due to an interaction between a product being conveyed and the conveying surface, to thereby produce a conveying surface exhibiting improved release characteristics and slipperiness. In particular, in a preferred embodiment, trough 60 can be made substantially of UHMW polyethylene material.

As the coefficient of friction of UHMW polyethylene material is generally in a range that is lower than the coefficient of friction of materials used in conventional conveyor systems, trough 60 can provide a conveying surface that allows a product to more easily slide across the conveying surface of trough 60 during a conveying operation. In particular, in a preferred embodiment, the UHMW material can have a dynamic coefficient of friction on polished steel that is in the range of about 0.1 to about 0.22. Accordingly, the UHMW material is capable of effectively resisting abrasion caused by the friction of materials continuously sliding across the conveying surface of trough 60. UHMW material's resistance to abrasion as well as the self-lubricating characteristics of UHMW material, makes UHMW material desirable for uses in many conveying settings, including the conveying of food products, and the conveying of chemical products.

Due to the non-conductivity of UHMW material, however, the conveying surface of the UHMW material can build up a significant static charge when conveying certain products. Accordingly, in a more preferred embodiment, the UHMW material that forms trough 60 is treated with, or can include, a static-dissipating material. Thus, trough 60 provides a conveying surface on which a product can easily slide due to improved resistance to friction, and a conveying surface that can effectively resist the build-up of a static charge.

Another advantage provided by making trough 60 substantially of UHMW polyethylene material is the much improved sanitary conditions of trough 60 over conventional conveyors that use UHMW material linings that are attached to the surface of a conveyor. That is, because trough 60 is made substantially of UHMW polyethylene material, there are no occurrences of contact gaps formed at positions where edges of the UHMW material linings meet a surface of the conveyor, nor are there contact gaps at spaces between the UHMW material lining and the surface of the conveyor to which the lining is attached. As a result, sanitary conditions are improved, and maintenance and cleaning requirements are also reduced.

In a preferred embodiment, trough 60 can be further provided with ear members being flanges 103, which extend outwardly from retainer portion 62, as shown in FIG. 1. Flanges 103 can be made of the same UHMW polyethylene material which forms trough 60. In an even more preferred embodiment, flanges 103 can be provided with an opening through which a retaining member, such as a bolt, shaft, or the like, can be slidably inserted. Thus, flanges 103 can be used to support trough 60, as will be described later.

Figure 2:
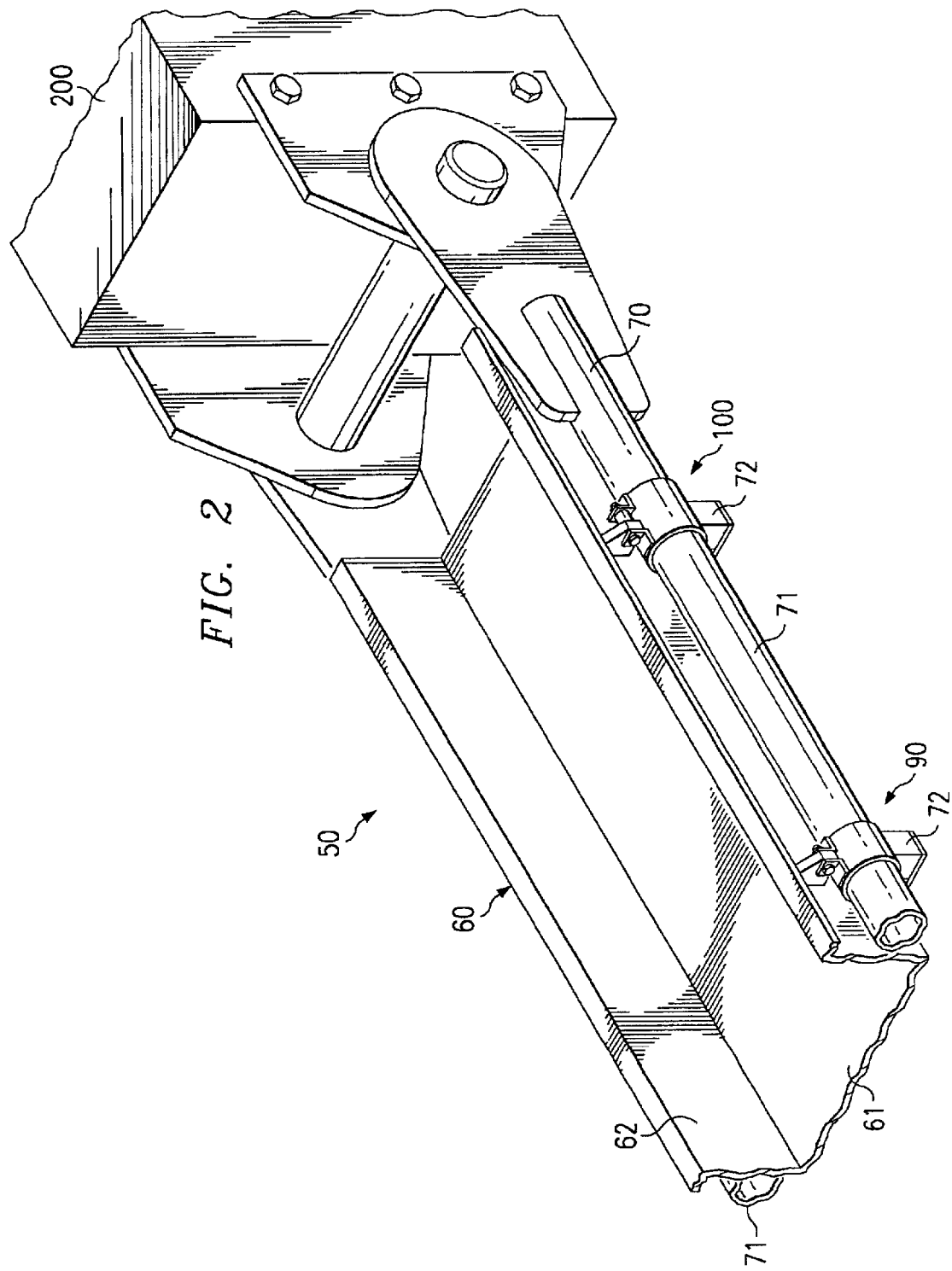
FIG. 2 is a perspective view of a conveying system of an embodiment of the invention.

Referring now to FIG. 2, a conveying system 50 is illustrated incorporating trough 60 of FIG. 1 as a conveying member of conveying system 50. According to an embodiment, conveying system 50 can include trough 60, a support structure 70 that supports trough 60, a drive unit 200 that is attached to support structure 70 for generating a conveying motion of trough 60, at least one securing member 90, and at least one biasing member 100, wherein each of the at least one securing member 90 and the at least one biasing member 100 are used to attach trough 60 to support structure 70.

As described above with respect to FIG. 1, due to the release characteristics of the UHMW polyethylene material that forms trough 60, conveying system 50 is capable of efficiently conveying food products, including those with a tendency to adhere to a conveying surface and cause product build up and possible clogging of the conveyor path, without accumulating a build up on the conveying surface. In addition, because trough 60 is made substantially of UHMW polyethylene material, contact gaps, and the problems caused by contact gaps in conventional conveying devices and methods, are greatly reduced. Specifically, the unsanitary conditions that are caused by contact gaps, and the cost and time associated with continuously attempting to seal and clean the contact gaps in order to maintain quality and production standards are greatly reduced.

Support structure 70 of conveying system 50 is provided to support trough 60 and to convey a motion from drive unit 200 to trough 60 in order to displace trough 60 and result in an eventual movement of a product in a conveying direction. In a preferred embodiment, support structure 70 is a ladder frame structure, which supports trough 60 along its length, as well as laterally across its width. Longitudinal members 71 extend from drive unit 200 and can run parallel to, and along the length of both sides of trough 60. Lateral support members 72 can be positioned beneath bottom portion 61 of trough 60 and can be secured to longitudinal members 71 on both sides of trough 60 to provide lateral support for trough 60 and to link longitudinal members 71. Lateral support members 72 are positioned across the width of trough 60 at predetermined intervals along the length of trough 60 in order to maintain the weight of trough 60 and the product being conveyed, and to oppose sagging of trough 60.

Support structure 70 can be constructed to support an inertial load created by an acceleration which drives trough 60 and effects the conveyance of a product. Trough 60 is then able to sustain the acceleration ranges typically required of conveyors in horizontal motion systems. Support structure 70 can also provide ample support against sagging at intermediate positions of trough 60, which is prone to sagging along the length of trough 60 if it is not supported at periodic intervals. Although the construction of support structure 70 has been described above with reference to a ladder frame structure, it is understood that any other support structure can be used without departing from the scope of the invention.

Conveying system 50 is preferably provided with at least one biasing attachment for securing trough 60 to support structure 70. The biasing attachment is capable of allowing relative movement between trough 60 and support structure 70 in a first direction and preventing relative movement between trough 60 and support structure 70 in any direction other than the first direction. These characteristics are provided by biasing member 100, which is illustrated in FIG. 3.

According to a preferred embodiment, biasing member 100 includes a first member 101 which is affixed to support structure 70, a second member 102 which is affixed to support structure 70 and spaced apart from first member 101, an elastomeric spring member 104, a flange 103, and a fastening member 105. First member 101 and second member 102 can be affixed to support structure 70 by any suitable affixing means, and can be integrally formed with support structure 70.

First member 101 is provided with a first opening at an interior portion of first member 101, and second member 102 is provided with a second opening at an interior portion of second member 102, such that the first opening and the second opening are substantially in alignment. Flange 103, which projects outwardly from an outer side of retainer portion 62 of trough 60, can be positioned between first member 101 and second member 102 to be in contact with second member 102 and not in contact with first member 101. Flange 103 is preferably provided with a third opening therethrough, which is in alignment with the first opening of first member 101 and the second opening of second member 102. An elastomeric spring member 104 is provided between flange 103 and first member 101, such that elastomeric spring member 104 is in contact with both first member 101 and flange 103. The elastomeric spring member 104 can be further provided with a fourth opening therethrough, which substantially aligns with the first opening of first member 101, the second opening of second member 102, and the third opening of flange 103. A suitable fastening member, for example, a nut and bolt combination, can be provided through each of the first opening, the second opening, the third opening, and the fourth opening, to maintain the axial alignment of each of the openings of first member 101, elastomeric spring member 104, flange 103, and second member 102, respectively.

According to the above description, biasing member 100 is capable of allowing a relative movement between trough 60 and support structure 70 in a direction parallel to a conveying direction, and prevent relative movement between trough 60 and support structure 70 in any direction other than a direction that is parallel to a conveying direction. In this way, growth and contractions of trough 60, for example, due to temperature changes, can be adequately accommodated by biasing member 100. More specifically, elastomeric spring member 104 allows trough 60 to expand and contract due to changes in temperature at each biasing member 100 at a predetermined rate. Elastomeric spring member 104 urges flange 103 against second member 102 with variable force such that at a time when trough 60 expands, for example, due to an increase in temperature, elastomeric spring member 104 can be compressed by the increasing force of the growth of trough 60 at flange 103.

Similarly, elastomeric spring member 104 can expand and urge flange 103 against the second member at a time when trough 60 contracts. Accordingly, elastomeric spring member 104 can adjust as trough 60 varies, while biasing member 100 as a whole provides sufficient resistive force to accelerate trough 60 along the conveying direction to effect conveying of a material in trough 60.

Securing member 90 of conveying system 50 can also be provided to secure trough 60 to support structure 70 along the length of trough 60. The construction of securing member 90 can be similar to the construction of biasing member 100 except for the omission of elastomeric spring member 104 from securing member 90. Accordingly, securing member 90 can include first member 101, flange 103, and second member 102, each provided with openings that are aligned with each other. A fastening member 105 can then be positioned through each opening in order to maintain the axial alignment of first member 101, flange 103, and second member 102, and the attachment of support structure 70 to trough 60.

The arrangement of biasing member 100 and securing member 90, according to the above description, enables trough 60 to accelerate along a longitudinal direction of trough 60, while allowing for growth and other material deformities, including changes induced by a temperature change in the environment in which trough 60 is maintained. Although biasing member 100 and securing member 90 can be placed at any position along the length of trough 60, in a preferred embodiment, securing members 90 are placed at a centralized location relative to the length of trough 60 in order to restrict movement or growth of trough 60 at a central location. In this way, the potential growth amount and the anticipated growth rate for trough 60 can be calculated for a specific environment in which conveying system 50 will be maintained, and biasing members 100 can be constructed and positioned at appropriate intervals along the length of trough 60 to allow for growth and deformities at the end positions along the length of trough 60, according to predetermined expansion and contraction rates.

Additionally, in a more preferred embodiment, each of securing members 90 and biasing members 100 can be placed at positions where lateral support members 72 join longitudinal members 71. Accordingly, securing member 90 and biasing member 100 can strengthen the support of trough 60 at the predetermined positions along the length of trough 60 where longitudinal members 71 are linked by lateral support members 72. Thus, trough 60 can move according to an acceleration induced by drive unit 200, while accommodating growth and deformations of trough 60.

Alternate embodiments of the present invention can include any suitable means for fixedly securing trough 60 to support structure 70. Similarly, each biasing member 100 can be constructed by any suitable means including any combination of a plurality of spring members as well as a plurality of flanges or ear members that protrude from the conveying member. Further, securing member 90 and biasing member 100 can be positioned at any position along the length of trough 60, including on opposing sides of trough 60 directly across from each other along the length of trough 60. Further still, the flanges may be replaced by any suitable structure, for example, slots provided in the trough, and brackets attached to the trough.

Figure 4:
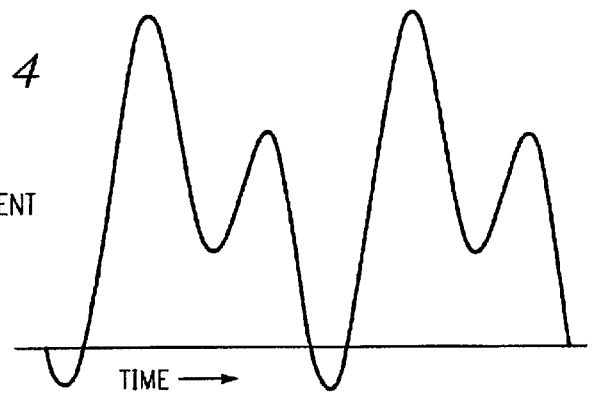
FIG. 4 is a plot of a motion generated by a drive unit of an embodiment of the present invention.

Support structure 70 is preferably powered by drive unit 200, which is capable of generating a motion as illustrated in FIG. 4, which can be described by the Fourier series:

$$f(t) = 2\sin(\omega_1 t) - \sin(2\omega_2 t)$$

wherein:

t=time;

$\omega_1$=an angular velocity of a first axis rotating about a second axis; and $\omega_2$=an angular velocity of a first connection rotating about said first axis.

The above function defines a waveform which has two harmonic components. The first component ($2\sin(\omega_1 t)$) has twice the amplitude of the second component ($\sin(2\omega_2 t)$), while the second component has twice the frequency of the first component. Further, the second component is moving in the opposite direction from the first component. The result is a series of oscillations parallel to the direction of travel which propels a product along the conveyor without causing the product to bounce on the conveying surface. The oscillations are made up of a slower advancing stroke and a faster retracting stroke. The slower advancing stroke moves in the conveying direction and carries the product with it. The faster retracting stroke causes the product to slide across and advance along the conveying surface by overcoming the friction between the product and the conveying surface. Repeating this motion causes the product to be conveyed, in the conveying direction, along the conveying surface. The conveying speed is increased by increasing either the amplitude or the frequency of the horizontal differential motion. A result of the motion described by the equation above is a conveying motion that is approximated by a saw tooth waveform when taken with respect to time.

As shown in FIG. 2, in a preferred embodiment, drive unit 200 is positioned at an end position of trough 60 and induces an acceleration to trough 60 in a reciprocating manner from that end position. However, it is understood that drive unit 200 can be positioned at various positions, including beneath trough 60, at a position above trough 60, or at a position beside trough 60.

According to the above description, drive unit 200 is used to drive conveying system 50 to effect a conveying motion. Trough 60, which is made substantially of UHMW polyethylene material, can be mounted onto support structure 70, and made to accelerate such that a product being conveyed is propelled in a conveying direction. Conveying system 50 is able to accommodate the material growths and deformities in trough 60 due to, for example, temperature changes in the environment in which conveying system 50 is contained. This is achieved by utilizing an arrangement of at least one securing member 90 and at least one biasing member 100, positioned at predetermined intervals along the length of trough 60. In a preferred embodiment, the intervals can be determined according to a calculated rate of expansion and contraction of trough 60.

Figure 5:
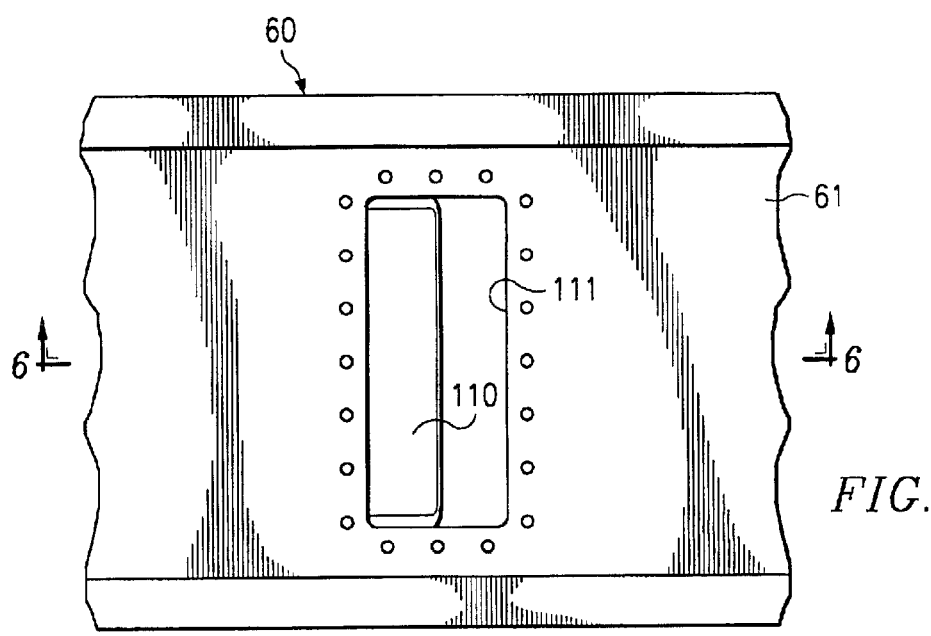
FIG. 5 is a top view of a conveying member with a gate disposed through a bottom surface of the conveying member.

Trough 60 of conveying system 50 can further include an aperture 111 through bottom portion 61 of trough 60, through which material being conveyed can exit trough 60 at intermediate positions along a conveying path. As illustrated in FIG. 5, a gate 110 is provided to selectively open and close aperture 111 in order to regulate the passing of materials being conveyed through aperture 111. In a preferred embodiment, gate 110 is made substantially of UHMW polyethylene material, thus providing the same advantages as outlined with reference to trough 60 being made substantially of UHMW polyethylene material.

Figure 6:
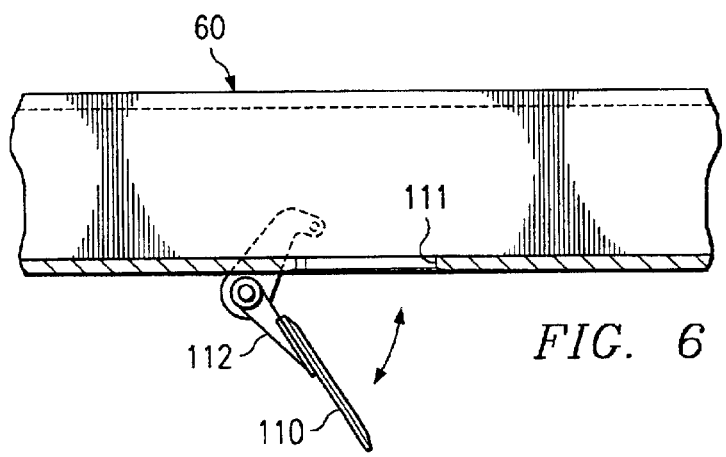
FIG. 6 is a side view of a gate disposed through a bottom surface of the conveying member operated by an actuator.

FIG. 6 further illustrates an actuator 112, attached to gate 110 for moving the gate between an open position and a close position. Any suitable actuator may be used, for example, hydraulic, pneumatic, electrical, etc.

In a preferred embodiment, the perimeter of each of aperture 111 and gate 110 can each be provided with complementary beveled, or chamfered edges. As a result, gate 110 is able to tightly close aperture 111, under all temperature conditions, including conditions in which the UHMW polyethylene material of gate 110 and trough 60 will expand and contract, or deform in a like manner. Thus, contact gaps that can be formed at aperture 111 are effectively eliminated, and the amount of product that is lost due to the presence of gaps between a conveyor and a gate at apertures in the floor of the conveyor are reduced. Moreover, the complementary beveled edges allow trough 60 and gate 110 to accommodate growth or deformities of both or either gate 110 and trough 60.

Figure 7:
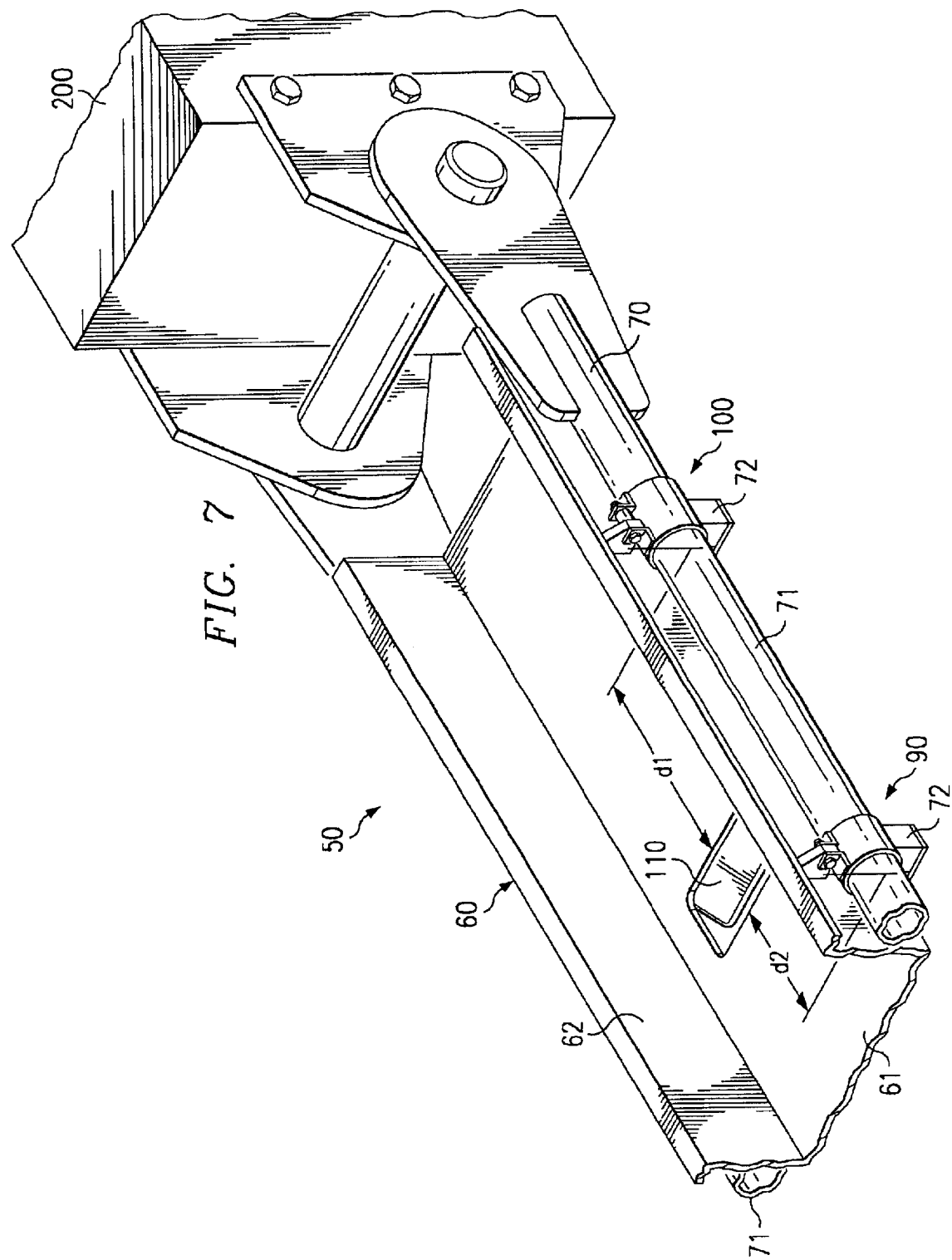
FIG. 7 is a perspective view of a relationship between a gate disposed through a bottom surface of a conveying member, and a securing member and a biasing member.

In the case where gate 110 is provided in a bottom portion of trough 60 to regulate the opening and closing of aperture 111 through the bottom portion of trough 60, it is more preferred that securing member 90 be provided to secure trough 60 to support structure 70 at a position that is closer to gate 110 than a position where biasing member 100 secures the trough to support structure 70. More specifically, as illustrated in FIG. 7, it is preferred that the distance d2 from securing member 90 to gate 110 is less than a distance d1 from biasing member 100 to gate 110. According to this arrangement, the amount of growth of trough 60 at or near aperture 111 can be minimized, and gate 110 and aperture 111 are predictably well aligned.

The conveyor of the present invention can be used in many conveying applications, including, but not limited to, straight and curved path conveying, split flow conveying, singulating, de-shingling, and size control screening. Therefore, although the present invention has been described with reference to a presently preferred embodiment, it will be appreciated by those skilled in the art that various modifications, alternatives, variations, etc., may be made without departing from the spirit and scope of the invention as defined in the appended claims.

What is claimed is:

1. A conveying system, comprising:

a conveying member having friction resistant properties;

a support structure for supporting the conveying member;

a driving unit for generating a conveying motion, the driving unit being attached to the support structure;

at least one securing member for rigidly securing the conveying member to the support structure; and at least one biasing member for allowing relative movement between the conveying member and the support structure along a first axis and for preventing relative movement between the conveying member and the support structure in any direction other than along the first axis, wherein the driving unit is capable of producing a conveying motion in the conveying member to advance materials along the conveying member in the conveying direction.

2. A conveying system, according to claim 1, wherein the conveying member has a dynamic coefficient of friction on polished steel which is in a range of about 0.1 to 0.22.

3. A conveying system, according to claim 1, wherein the conveying member is a trough and the conveying direction is substantially parallel to a lengthwise direction of the trough.

4. A conveying system, according to claim 1, wherein the conveying member has anti-static properties.

5. A conveying system, according to claim 1, wherein the conveying member is made substantially from an ultra-high-molecular-weight polyethylene material.

6. A conveying system, according to claim 1, wherein the conveying motion is described by the function:

$$f(t)=2\sin(\omega_1 t)-\sin(2\omega_2 t)$$

wherein:

t=time;

$\omega_1$=an angular velocity of a first axis rotating about a second axis; and $\omega_2$=an angular velocity of a first connection rotating about said first axis.

7. A conveying assembly comprising:

a conveying member which consists primarily of a material having friction resistant properties;

a support structure for supporting the conveying member;

at least one securing member for rigidly securing the conveying member to the support structure; and at least one biasing member for allowing relative movement between the conveying member and the support structure along a first axis and for preventing relative movement between the conveying member and the support structure in any direction other than along the first axis.

8. A conveying assembly, according to claim 7, wherein the conveying member has a dynamic coefficient of friction on polished steel which is in a range of about 0.1 to 0.22.

9. A conveying assembly, according to claim 7, wherein the conveying member has anti-static properties.

10. A conveying assembly, according to claim 7, wherein the conveying member is a trough and the conveying direction is substantially parallel to a lengthwise direction of the trough.

11. A conveying assembly, according to claim 7, wherein the conveying member is made from an ultra-high-molecular-weight polyethylene material.

* * * * *